United States Patent [19]

Sunshine

[11] Patent Number: 5,140,658
[45] Date of Patent: Aug. 18, 1992

[54] OPTICAL AMPLIFIERS INVOLVING SINGLE CRYSTAL WAVEGUIDES

[75] Inventor: Steven Arthur Sunshine, Berkeley Heights, N.J.

[73] Assignee: AT&T Bell Laboratories, Murray Hill, N.J.

[21] Appl. No.: 691,958

[22] Filed: Apr. 26, 1991

[51] Int. Cl.[5] .......................... G02B 6/00; G02B 6/36
[52] U.S. Cl. ......................................... 385/49; 372/40
[58] Field of Search ........................... 372/20, 40, 41; 350/96.15, 96.20–96.21

[56] References Cited

U.S. PATENT DOCUMENTS 4,272,733  6/1981  Walling et al. .................. 372/20
4,932,031  6/1990  Alfano et al. .................. 372/20 X

OTHER PUBLICATIONS

Kaminskii, *Laser Crystals*, (Springer-Verlag 1981).
Muller et al., *The Major Ternary Structural Families*, (Springer-Verlag 1981).
Laudise, *The Growth of Single Crystals*, (Prentice-Hall 1970).
Feigelson, *Material Science and Engineering*, B1, p. 67 (1988).
Nishihara et al., *Optical Integrated Circuits*, (Prentice-Hall 1970).
Hunsperger, *Integrated Optics Theory and Technology*, (Springer-Verlag 1982).

*Primary Examiner*—Akm E. Ullah
*Attorney, Agent, or Firm*—B. S. Schneider

[57] ABSTRACT

Optical amplifiers that are useful, for example, in optical communications are formed using a single crystal host waveguide and a dopant such as a transition metal. Through this combination, the amplified wavelength is adjustable and amplification at 1.3 μm is possible.

8 Claims, 1 Drawing Sheet

OPTICAL AMPLIFIERS INVOLVING SINGLE CRYSTAL WAVEGUIDES

BACKGROUND OF THE INVENTION

1. Field of the Invention

This invention relates to optical amplifiers and in particular optical amplifiers involving doped materials.

2. Art Background

Considerable recent research has involved the development of optical amplifiers useful in optical communications. Typically, these amplifiers involve a waveguide formed in a glassy material (a material that has no long-range ordering and is characterized by an absence of Bragg peaks in X-ray diffraction and/or a glass transition observed in differential scanning calorimetry) with a rare earth dopant present in the waveguide core and with a region of lower refractive index surrounding the core. Since the glassy material host does not substantially affect the emission spectrum of the dopant, the rare earth material is chosen to have a spectral emission line corresponding to a wavelength at which optical communication is to be performed. For example, most long-haul optical communication is performed either at 1.3 $\mu$m or 1.55 $\mu$m.

Optical amplifiers at 1.55 $\mu$m have been demonstrated. These amplifiers involve a waveguide fiber having erbium, that emits at 1.53 to 1.58 $\mu$m, present in the core at concentrations typically in the range 10 to 1000 parts per million. In operation optical power of wavelength 0.975 or 1.48 $\mu$m is introduced into the waveguide core along with a signal at wavelength 1.55 $\mu$m. The optical power induces a transition in the erbium that populates a state capable of decaying to emit at 1.55 $\mu$m, and the signal induces this decay from the populated state. Thus, the output from the amplifier involves a signal at 1.55 $\mu$m that has an intensity approaching that of the combined power and signal inputs. In this manner, an optical signal is amplified without conversion to an electrical signal, amplification of this signal electronically and then conversion back to an optical signal.

Although the erbium/glass optical fiber configuration shows greater promise at 1.55 $\mu$m, amplification at 1.3 $\mu$m for this system is not possible. Alternatively, approaches have been proposed for the 1.3 $\mu$m wavelength. For example, investigations have involved the use of neodymium in a silica glass fiber waveguide. Although the amplified output of a signal at 1.32 to 1.37 $\mu$m is possible, this output is accompanied by a corresponding signal at 106 $\mu$m that is three times more intense. The presence of this more intense parasitic signal together with a strong absorption in the silica fiber at 1.37 $\mu$m, and the presence of excited state absorption makes this approach less than entirely desirable. Although a variety of dopants have been utilized in glassy materials to form amplifiers in a waveguide configuration, a promising approach at 1.3 $\mu$m for such configurations is not presently available.

SUMMARY OF THE INVENTION

By employing a suitable dopant such as a transition metal in the single crystal core of a waveguide, it is possible to suitable adjust the output wavelength for a desired spectral emission including 1.3 $\mu$m. For example, the use of Cr in the +4 oxidation state on the tetrahedral site of a $Y_2SiO_5$ crystal allows amplification of signals in the 1.25 to 1.35 $\mu$m spectral range.

In the inventive approach of employing a suitable dopant on a crystal lattice site, the dopant is chosen to have an emission transition in the desired spectral range. The atom is maintained in this oxidation state by introducing it on a crystal site which requires the desired oxidation state. In one example, the tetrahedral crystal site of $Y_2SiO_5$ will not receive Cr except in the desired, +4, oxidation state. In contrast, introduction of Cr into an amorphous material such as silica glass allows the Cr to exist in the energetically favored $Cr^{3+}$ oxidation state and thus precludes use of the desired transition.

Additionally, use of a single crystal host allows higher dopant concentrations than practical in amorphous material. The introduction of dopant at crystal sites precludes spatial aggregation of dopant atoms. In an amorphous host, spatial aggregation is possible and this aggregation allows emission from one dopant atom to be subsequently absorbed by a second, closely adjacent dopant atom. The resulting ability to use relatively high dopant concentrations in a crystalline host and the concomitant enhanced gain allows use of waveguides having a length in the range 1-10 centimeters. For typical concentrations in an amorphous host, waveguide lengths in the range 1 meter to 1 kilometer are required for the same level of amplification. Thus, by utilizing a single crystal host amplification, a 1.3 $\mu$m signal is possible and substantial reduction of waveguide lengths is also attainable.

DETAILED DESCRIPTION

Figure 1:
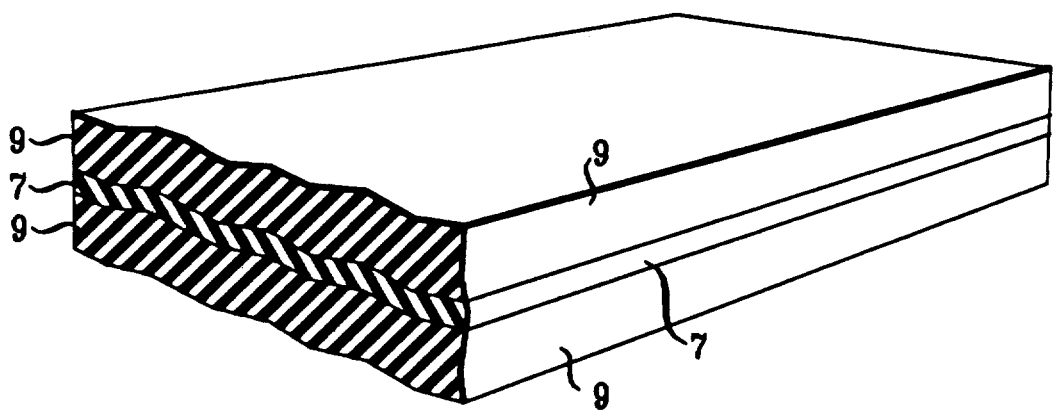
FIGS. 1 and 2 are illustrative of configurations involved in the subject invention.

As discussed, the applicant's invention involves employing a dopant atom (in a non-zero oxidation state) in a single crystal guiding region. Typical dopants include transition metals such as Cr and rare earth materials such as Pr and Nd.

The host for the dopant is chosen to maintain the dopant in the desired oxidation state and to cause an excitation state interaction with the host resulting in emission at the desired wavelength. The symmetry of the site at which dopant atoms are introduced as well as the size and oxidation state of the crystal-constituent-atom being replaced by the dopant determines the allowed oxidation states of the dopant atoms. Site symmetries, exemplary crystals having those symmetries, and the other properties that lead to a desired oxidation state are well known and are tabulated in compendiums such as *Laser Crystals*, Alexander Kaminskii, Springer-Verlag, 1981, and *The Major Ternary Structural Families*, M ler & Roy, Springer-Verlag, 1974. Introduction of dopants into a specific crystal lattice site is a well-known procedure that is accomplished by methods such as Czochralski growth, top seeded solution growth, or laser pedestal growth. (See *Growth of Single Crystals*, R. Laudise, Prentice-Hall, 1970, for a complete description of these processes.) Thus, for example, $Cr^{4+}$ is maintained in this oxidation state by introduction into the tetrahedral (silicon) crystal site of a $Y_2SiO_5$ crystal.

The gain of the amplifier is proportional to the concentrations of the dopant in the crystal structure. Typically, dopants are introduced in the concentration range 0.05 to 2 atomic percent. Concentrations less than 0.05 atomic percent typically lead to undesirably low gain and concentrations above b 2 atomic percent are not desirable because the possibility of concentration quenching is substantially enhanced. Since substantially greater dopant concentrations are possible in single crystal materials than in amorphous materials without inducing substantial dopant quenching, the opportunity for enhancing gain per unit length of the waveguide is significant. Generally, this enhanced gain is used by employing a substantially shorter waveguide than in a corresponding amplifier having an amorphous host. Thus, for example, amorphous host amplifiers having a length of 1 to 1000 meters are replaceable by single crystal counterparts of substantially shorter lengths, e.g., lengths shorter than 20 cm.

As previously indicated, in the case of transition metal atoms the single crystal host interacts and perturbs the energy levels of the dopant atom. (Dopant energy levels are well known from compiled spectroscopic data.) This interaction results in a broadening of the atomic levels typically in the range 500 to 3000 cm$^{-1}$. It is possible to determine the exact extent of broadening by spectroscopic measurements. The output spectrum and thus the wavelength at which amplification is possible, is thus correspondingly broadened. In this manner, the tailoring of a host and dopant combination to amplify a desired wavelength is significantly more conveniently obtained than in an amplifier relying on an amorphous host.

Waveguides are formed by conventional techniques. For example, a single crystal is pulled into a fiber as described by Feigelson in *Material Science and Engineering*, B1, 67(1988). The core of this fiber typically has dimensions in the range 6 to 20 82 m. Smaller dimensions are difficult to fabricate while larger dimensions significantly decrease attainable gain. The cladding of this fiber is then formed by ion implantation of materials such as He$^+$ into the peripheral area of the fiber. The implanted ions cause damage which results in a refractive index lowering relative to regions that are undamaged or have significantly less damage. Thus, by implanting a fiber to a depth which produces the desired core, a guiding structure having a core of higher index and a damaged cladding of lower index is formed. A control sample is easily used to determine the extent of damage necessary to produce the desired guiding structure.

Figure 2:
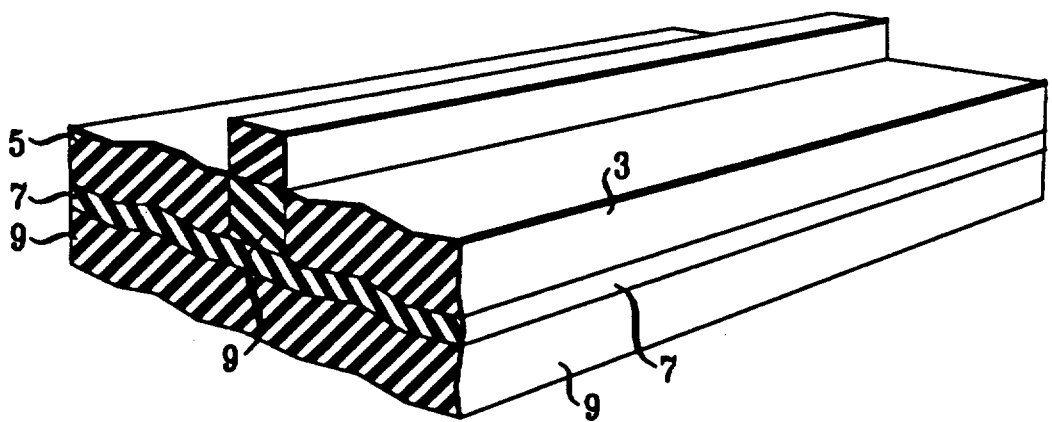

Waveguides formed in a planar geometry are also possible. For example, a single crystal material is implanted to form region 7 in FIG. 1 that is significantly more damaged than doped single crystal region 9,. A material such as photoresist is then deposited on the substrate and patterned by conventional techniques such as lithography in conjunction with etching to form the configurations shown in FIG. 2. (Lithographic and etching techniques are described respectively in Nishihara et al, *Optical Integrated Circuits*, McGraw-Hill, 1985.) The regions not masked by the deposited material are then again damaged by implantation L(areas 3 and 5 in FIG. 2) to form a three-dimensional waveguide. Thus, waveguides in both curved and rectilinear geometries are possible. Production of waveguides through deposition or growth of material of appropriate refractive index on a substrate is also possible and is not precluded.

The resulting amplifiers are useful for amplification signals associated with optical communications. Nevertheless, other applications such as high power optical amplifiers contemplated for use in cable television systems are possible and are not precluded. Insertion of signal and amplification power is accomplished as described in *Integrated Optics Theory and Technology* by Harisperger, Springer-Verlag, 1982. Output signals are coupled to a waveguide as described in Harisperger supra. Typical approaches for input and output coupling include use of an input and output silica optical fiber butted to the waveguide region of the amplifier.

The following examples are illustrative of materials suitable for use in the invention.

EXAMPLE 1

A neodymium doped crystal of $Y_2SiO_5$ was employed as a substrate. The concentration of the neodymium was approximately 1 atomic %. The neodymium doped crystal was grown by conventional Czochralski growth techniques. The neodymium dopant replaced yttrium and was in the +3 oxidation state. The major surface of the crystal which measured approximately 2 cm in diameter was in the <101> crystallographic plane. The pulled crystal boule was cut to yield a substrate having a thickness of approximately 1 mm. The substrate was immersed in acetone, ultrasonically cleaned, and rinsed in methanol. The wafer was placed on the sample holder of an ion implantation machine 3.75 MeV van der Graff accelerator (High Voltage Engineering). Implantation with He$^+$ was accomplished using an acceleration voltage of approximately 1.25 MeV to a dose of approximately $1 \times 10^{15}$ ions per cm$^2$. During implantation the wafer was cooled utilizing a liquid nitrogen finger. The implantation produced a damaged region having a gaussian profile centered at a depth of approximately 2.5 μm and skewed toward the surface.

The wafer was again sequentially immersed in acetone and methanol. Sufficient photoresist was introduced onto the implanted surface of the wafer to produce after spinning at 4,000 rpm a resist layer approximately 1.8 μm thick. (The resist used was Shipley 1350J photoresist.) The resist was patterned in a series of lines from 2-12 μm thick in intervals of 12 μm. This patterning was accomplished using standard ultraviolet exposure together with a developer supplied by the Shipley Company. The surface having the patterned photoresist was then implanted with Be$^+$ ions at an acceleration voltage of 300 KeV to give a dosage of $5 \times 10^{15}$ ions per cm$^{12}$.

EXAMPLE 2

The procedure of Example 1 was followed except before initial implantation with He a layer of approximately 1.5 μm thick silicon dioxide was deposited on the single crystal substrate by chemical vapor deposition using a tetraethylorthosilicate precursor. The wafer was He$^+$ implanted as in Example 1, except the acceleration voltage was increased sufficiently to yield the same average depth of 2.5 μm into the single crystal material. The silicon dioxide was patterned using the photoresist and lithographic procedure described in Example 1 with reactive ion etching of the silicon dioxide with a CF$_4$ plasma. The resist, after etching of the silicon dioxide, was removed using acetone.

I claim:

1. A device suitable for amplifying an optical signal at a desired wavelength, said device comprising means for introducing said signal, means for introducing optical power for said amplification, output means, and a region suitable for guiding said signal and said optical power characterized in that said region comprises 1) a single crystal core including a dopant and 2) adjacent cladding of lower refractive index than said core to provide said guiding, wherein said dopant is an atom in an oxidation state having an electronic structure that interacts with said single crystal material to provide amplification at said wavelength.

2. The device of claim 1 wherein said atom comprises chromium.

3. The device of claim 2 wherein said single crystal material comprises $Y_2SiO_5$.

4. The device of claim 1 wherein said single crystal material comprises $Y_2SiO_5$.

5. The device of claim 1 wherein said region comprises a fiber.

6. The device of claim 1 wherein said atom comprises a transition metal.

7. The device of claim 1 wherein said means for inputting optical power comprises butt coupling between said guiding region and a silica fiber.

8. The device of claim 1 wherein said output means comprises butt coupling between said guiding region and a silica fiber.

* * * * *